United States Patent Office 3,845,067
Patented Oct. 29, 1974

3,845,067
PREPARATION OF CURABLE POLYESTER-MONO-
MER/WATER EMULSIONS WITH A BASIC
BORATE AS EMULSIFIER
Julio Lopez Mesa, 638–B Salem St.,
Glendale, Calif. 91203
No Drawing. Original application Jan. 4, 1971, Ser. No.
103,807, now abandoned. Divided and this application
Apr. 20, 1972, Ser. No. 245,788
Int. Cl. C08g 51/24
U.S. Cl. 260—29.6 NR        21 Claims

ABSTRACT OF THE DISCLOSURE

Water soluble, basic borates render unsaturated polyester resins compatible with water. The resulting polyester basic borate water compositions are homogeneous in nature and may be cured to a fire retardant product upon the addition of a conventional catalyst system.

Background of the Invention

This is a division of my application Ser. No. 103,807 filed Jan. 4, 1971, now abandoned.

Conventional unsaturated polyester resins are produced by reacting at least one dihydric alcohol with at least one dibasic or dicarboxylic acid. Either the alcohol and/or the acid is ethylenically unsaturated. The resultant unsaturated resin will cure or cross-link with adjacent polyester chains of similar structure by direct reaction, or more commonly, through the double bond of an ethylenically unsaturated monomer, such as styrene, upon the addition of a catalyst. The product is a thermoset resin.

Because of the high viscosity of unsaturated polyester resins most conventional commercial formulations usually contain at least one monomer which reduces viscosity for handling purposes and which ultimately serve as the bridge between adjacent polyester chains when subjected to a cross-linking reaction. A wide variety of resin properties both before and after cure can be achieved through variations in the composition of the base polyester; the type and amount of cross-linking monomer and the catalyst system employed.

The preparation, polymerization and uses for polyester resins have been well published and have been discussed at length in texts such as *Polyester Resins, by John R. Lawrence,* Reinhold Publishing Company, 1960, and *Handbook of Reinforced Plastics of the S.P.I., by Oleesky and Mohr,* Reinhold Publishing Company, N.Y., 1964, both of which are incorporated by reference.

It has been known from U.S. Pat. 3,311,035 to incorporate granular boric acid as discrete filler particles in polyester resin compositions employed in the making of heat-resistant mats.

In U.S. Pat. 3,214,400 to Silver it was disclosed that boric acid could be substituted for a portion of the unsaturated dicarboxylic acid, on an equivalent stoichiometric basis, in the preparation of polyester resins having a greater tolerance for other resins when employed as a component of a non-punking binder for glass wools. The disclosure taught, in substance, the preparation of aqueous solutions of the reaction product of a polyhydric alcohol, an $\alpha,\beta$ unsaturated dicarboxylic acid and boric acid in which the $BO_3$ content of the reaction product was from about 1% to 8%, preferably 3% to 4.5%.

Water extendable polyester resins commonly known as WEP have recently become a commercial reality. Presumably prepared according to the teachings of U.S. Pat. 3,256,219, water extendable polyesters will form a stable water-in-oil emulsion over certain prescribed ranges when water is added to the polyester resin with high agitation. The product formed, on cure is as taught by the patent, a porous mass in which droplets of water encapsulated in a surrounding polymeric structure, or if fairly large quantities of water are used, the cells interconnect.

I have found that while water extendable polyester resins may be formed into a stable emulsion, this requires high agitation in the order of 4,000 r.p.m., or more. In addition, while the emulsion will accept small amounts of fillers, the fillers tend to break the emulsion within a short period of time. For instance, when as little as 5 percent by weight sawdust are added to a polyester water-in-oil emulsion containing 40 percent by weight resin and 60% by weight water, the emulsion will break and water will separate from the resin. When the broken emulsion is catalyzed, at best, only a sticky useless mass will be obtained.

In addition, once the emulsion has broken, reagitation will not reconstitute it.

Summary of the Invention

It has now been found that conventional polyester resins are compatible with water in the presence of a water soluble basic borate compound. The amount of the basic borate compound required to induce water compatibility will vary depending on the nature of the resin. Generally, 10 parts by weight of the basic borate compound per 100 parts by weight resin will induce some degree of compatibility while the presence of about 20 parts by weight will permit the addition of up to 600 parts by weight water to 100 parts by weight resin.

The resultant mixture of polyester resin, water soluble basic borate compound and water is stable and homogeneous. Upon the addition of conventional initiators, promoters, and catalysts, the mixture will cure into a homogeneous solid which is fire resistant. Unlike water-in-oil emulsions formed by the addition of water to a water extendable polyester resin the curable or cured compositions of this invention do not contain water in the form of discrete dispersed droplets. Rather, the water appears to be in some way, coupled to the borate compound and/or the polyester resin.

Curable, water compatible compositions may be prepared by blending the basic borate compound with polyester resin followed by the addition of water with agitation. Preferably, however, the alkalineborate compound is first dissolved in the water usually with heating and the aqueous solution added to the polyester resin with stirring or agitation.

A curable, liquid pre-polymer master-batch which is water compatible, and solids free, may be prepared by combining an aqueous solution, of at least one water soluble basic borate compound and an amount of water only sufficient to dissolve the borate compound with the polyester resin. This provides a liquid system quite analogous to that commonly available and to which water can be added as an extender to establish a desired curable composition.

The compositions of this invention may be used in molding, casting, coating applications and as binders.

In addition, the water soluble basic borate compound, when used with a water extendable polyester may cause the water extendable polyester to behave as a conventional polyester in that there may be formed a cured product free of dispersed droplets of water. In addition, where a water-in-oil emulsion as provided by the water extendable polyester resins is broken, the emulsion can be reconstituted by the addition of a water soluble basic borate compound.

Description

According to the present invention there is provided polyester-water soluble basic borate compound-water systems which are fully compatible to cured products formed therefrom. The invention is based on the finding that a water soluble basic borate compound renders conventional polyester resins fully compatible with water.

By the term water soluble, basic borate compound there is meant a compound which can be dissolved in water at ambient or elevated temperatures and which will normally form aqueous solutions which are neutral to basic in nature. Among the borate compounds which may be used there may be mentioned sodium tetraborate decahydrate ($Na_2B_4O_7 \cdot 10H_2O$) sodium tetraborate pentahydrate ($Na_2B_4O_7 \cdot 5H_2O$) the sodium metaborates $$(Na_2B_2O_4 \cdot 8H_2O) \text{ and } (Na_2B_2O_4 \cdot 4H_3O);$$

ammonium tetraborate [$(NH_4)_2B_4O_7 \cdot 4H_2O$]; ammonium pentaborate [$(NH_4)_2B_{10}O_{16} \cdot 8H_2O$]; potassium tetraborate ($K_2B_4O_7 \cdot 4H_2O$); disodium octaborate tetrahydrate ($Na_2B_8O_{13} \cdot 4H_2O$), sodium borate and the like.

As used within the scope of this invention, the term polyester resin is intended to include cross-linkable unsaturated polyester resins prepared by the reaction of a polybasic acid and a dihydric alcohol and wherein the alcohol and/or acid moieties are unsaturated.

Illustrative, but no wise limiting, of the dihydric alcohols which may be used in the preparation of the polyesters there may be mentioned ethylene glycol, propylene glycol, butylene glycol, diethylene glycol, dipropylene glycol, triethylene glycol, isopropylidene bis-(p - phenyleneoxy-propanol-2), and the like.

Suitable dibasic acids include among others, phthalic anhydride, isophthalic acid, tetrahydrophthalic anhydride, hexahydrophthalic anhydride, endomethylene tetrahydrophthalic anhydride, tetrachlorophthalic anhydride, succinic acid, glutaric acid, adipic acid, pimelic acid, suberic acid, azelaic acid, sebacic acid, fumaric acid, itaconic acid, citraconic acid, mesaconic acid, and the like. Isophthalic acid, based resins because of their chemical resistance and good acceptability for water are preferred.

As is conventional, these polyester resins are normally provided in solution with a cross-linking monomer which reduces viscosity for handling purposes. While styrene is the most conventional monomer, there may also be present one or more cross-linking monomers such as methyl methacrylate, vinyl toluene, α-methyl styrene, divinyl benzene, dichlorostyrene, diallyl phthalate, triallyl cyanurate, and the like. The monomers impart different characteristics to the end product and are normally, as is understood by one skilled in the art selected based on the desired characteristics of the end product.

The water compatible curable compositions of this invention may be formed by the addition of one or more water soluble basic borate compounds to the polyester resin. Water may then be added with agitation and where necessary, heat. Preferably, however, the borate compound is first dissolved in water and the aqueous mixture added to the polyester resin system. In either event, the resultant mixture will be homogeneous in nature and will cure upon the addition of conventional initiators and promoters such as dimethyl aniline, cobalt octoate and the like followed by a catalyst such as methyl ethyl ketone peroxide, benzoyl peroxide and the like. Curing may be achieved at ambient temperatures or accelerated by the application of heat.

Unlike conventional water extendable polyester resins, the contained water in the cured product will be fully dispersed and, in some way, bound into the cured resin as opposed to existing as encapsulated droplets.

While not bound by theory, it is believed this results from some interaction between the water, the basic borate compound and the polyester resin. Possibly, much of the water is bound to the borate compound as water of crystallization and this complex, in turn, associates in some way with the polyester resin. Whatever the association, cured products contain substantially all of the water added to the resin in formulating a curable mass. Even heating to temperatures to about 180° F. will not completely remove all the contained water.

The bound water is, moreover, important to imparting to the flame retardant characteristics to the cured products. When subject to extreme temperature conditions such as, for instance, the action of the flame of a propane torch, the contained water will first vaporize. This will be followed by a loss of the water of crystallization from the water soluble borate compound. Both phenomenon absorb heat from the flame which materially delays or retards ignition of the polyester.

On the other hand, the compositions also are equally useful as binders for powdered material and ceramic materials which are to be fired to yield a sintered or fused mass. The polyester in these systems will pyrolyze to yield an ash-free product and, for some materials, the borate compound acts as a flux to aid fusion.

The amount of water soluble basic borate compound required to make a polyester resin system, including any monomer present, compatible with water will depend, in part, on the nature of the polyester resin. For general purpose the addition of 10 parts or more by weight of the borate compound per 100 parts by weight resin will induce some degree of water acceptance. For most resins, amount of 20 parts by weight per 100 parts resin or more will permit the additions of up to 600 parts by weight water per 100 parts by weight resin. The maximum amount of the borate compound which may be added may be varied widely and will depend on the desired end use application including the degree of fire retardancy desired. Little benefit, however, can be gained by adding more of the borate compound that can be dissolved in the added water unless it is desired to have a solid borate compound present as a filler or as fire retardant material. The presence of the borate compound in solution or as a filler, however, will not impede the ability of the system to undergo the desired cross-linking reaction.

In formulating the polyester-borate compound-water systems of this invention, the borate compound may be, as indicated, added directly to the polyester resins followed by the addition of water or in the form of an aqueous solution in which the borate compound is dissolved. In most instances, heating will be required to achieve solution of the borate compound in water. For some polyester resins, the formulation of an homogeneous mixture may be achieved in simple stirring, whereas, with others, agitation may be required.

For convenience, there may be prepared a master-batch in which the water soluble basic borate compound is dissolved in an amount of water only sufficient to give a clear solution free of solids. This solution may then be mixed with the polyester resin in an amount sufficient to provide the desired borate compound content based on the amount of resin present, and which then may be extended at any time by adding additional water.

There may also be incorporated into the master-batch conventional cross-linking monomers or they may be added where desired, prior to catalyst addition.

The compositions of this invention prior to cure will vary in consistency from a cream to a gel-like substance with viscosity increasing as the amount of water is increased.

When the water soluble basic borate compound content of the system is adequate to give good water compatibility, the amount of water which may be added to the system is independent of borate compound content. In addition, borate content may be varied, within the limits set forth above, independently of water content.

As with conventional polyester resins cure times and cure rates for the polyester resin-borate compound-water systems of this invention will vary depending on the nature of the polyester system and the nature and quantity of the catalyst and initiators employed. The nature of the products, likewise, will vary depending on the nature of the polyester and monomer used as well as the amount of water in the system. At low water contents there will be obtained products which display high impact resistance and toughness and will range from hard to flexible in nature depending on the polyester resin system used. At water contents above about 100 to 150 parts per 100 parts resin, the cured mass will be increasingly brittle.

Cured products of high water content, however, have utility for decorative devices and as temporary binders. An example of this utility is as a binder for powdered metals, ceramic and the like which are to be ultimately fired into a fused end product and during which the polyester is pyrolyzed. Because of high water extendability, only a low resin binder content may be required and as a consequence ash residue will be negligible. In addition, in fusible composition such as those containing silica and an insoluble borate, the borate will act as a flux to aid in fusion of the ingredients.

A particular utility for the compositions of this invention is as a binder for the cores of fire proof walls and roof construction. I have found that cores of unusual strength, light weight, and extreme fire resistance, can be prepared using the polyester compositions of this invention. This wall core construction comprises chopped glass fibers and one or more inert inorganic fillers such as silica, perlite (expanded silica), vermiculite, asbestos, insoluble borates and the like. In the preferred blends also be included in the compositions water and polyester compatible absorbents, stabilizers, colorants and like materials to enhance the aging characteristics and aesthetical appeal of the compositions.

Examples 1 to 6

A conventional unsaturated liquid polyester resin manufactured by Reichhold Chemicals, Inc., and known as R.C.I. 98–786 was used in preparing cured compositions of varying water content. In each instance, to 40 pts. by weight of the polyester resin there was added 10 parts by weight styrene monomer, 50 parts by weight sodium tetraborate decahydrate, and depending on the cure rate desired, 0.2% to 0.7% by weight of the resin dimethyl aniline as an initiator, and 1% to 10% by weight based on the weight of the resin cobalt octoate as a promoter. Water was added in varying quantities with agitation. In each instance, there was formed a homogeneous mixture, white to light tan in color and varying in consistency from a cream-like mass to a gel with viscosity increasing in proportion to the amount of water added.

In each instance, there was added from 0.5% to 2% by weight based on the weight of the resin of methyl ethyl ketone peroxide as the catalyst. The cross-linking reaction was promoted by the application of heat. Each sample cured without apparent water loss. The results are shown in Table I.

TABLE I

| Example | 1 | 2 | 3 | 4 | 5 | 6 |
|---|---|---|---|---|---|---|
| Polyester, parts by wt | 40 | 40 | 40 | 40 | 40 | 40. |
| Styrene monomer, parts by wt | 10 | 10 | 10 | 10 | 10 | 10. |
| $Na_2B_4O_7 \cdot 10H_2O$, parts by wt | 50 | 50 | 50 | 50 | 50 | 50. |
| Water, parts by wt | 25 | 50 | 75 | 100 | 200 | 300. |
| Parts water/100 parts resin | 50 | 100 | 150 | 200 | 400 | 600. |
| Remarks | Hard, high impact. | Hard, high impact. | Hard, good impact. | Hard, good impact. | Hard, low impact. | Hard, brittle. | the chopped glass fibers comprise about 10% to about 20% by weight of the combined weight of the glass fibers and fillers. To this mixture, which is normally dry blended, there is added an amount of a polyester-borate compound-water binder system sufficient to provide from about 1% to about 10% by weight polyester resin or more per total weight of the mixture of glass fibers and inorganic filler and binder.

The resultant product is extremely fire resistant in that when the flame of a propane torch is applied to the surface there will be minor smoking at the area local to the flame. In addition, there will be only localized penetration of the core at the flame zone. When silica is present, the borax will act as a flux to fuse with the silica into a glass. This absorbs additional heat from the flame and slows the rate of penetration through the core.

Cores constructed in accordance with the practice of this invention are light, having a density only from about 25 to about 40 pounds per cubic foot. They may be used as such or laminated to, or sandwiched between a variety of materials. They may, for instance, be applied to the cores a vinyl layer, vinyls reinforced with glass fibers, wood, asbestos, metals and the like.

The polyester resins systems of this invention may also be used as binders in the construction of such articles of commerce as asbestos board. Asbestos may, for instance, be mixed with the polyester binders of this invention and after the addition of a catalyst and prior to cure pressed into any desired shape. Upon curing, the polyester resins systems of this invention serve as fire retardant binders for the asbestos board.

Although the presence of the borate compound, per se, induce fire retardant characteristics, other fire retardant materials such as antimony trioxide, chlorinated hydrocarbons and the like may also be included. There may A sample of the uncatalyzed homogeneous mass having the composition shown for Example 6 was allowed to stand for one week at room temperature. A minor amount of water separated from the mass. The water, however, recombined into the mass upon agitation.

A cured polyester composition prepared from the formulation used in Example 4 was brought into contact with the flame of a propane torch. At first the contained water volatilized. After two to three minutes exposure to the flame, however, only the surface of the resins local to the flame was coated with a minor amount of char dust.

Examples 7 to 10

A resin formulation identical to the formulation of Example 5 was prepared except there was used as the borate compound a mixture of 50% sodium borate decahydrate and 50% of a sodium borate product (FR–28) and manufactured by U.S. Borax and Chemical Corporation. The resultant water extended polyester composition was used as a binder for a mixture of silica, asbestos and Rasorite 65 (an anhydrous sodium borate concentrate), powdered bronze, powdered iron and powdered stainless steel.

In each instance the blend was formed into a mat and the polyester allowed to cure. The resultant mats had sufficient integrity to permit handling. When fired at 1700° F. for 10 minutes the borax-asbestos-silica mixture fused (Example 7). The fused material was allowed to cool and was color coated with a porcelain enamel which was fired again to provide a porcelain glaze coat.

When fired to the same temperature the metals sintered into solid, hard bodies. Some were brittle. The sintered bronze, however, was very tough. In each instance, the polyester pyrolyzed and did not leave a carbon residue. The formulations used in each instance are shown in Table II.

TABLE II

| Example | Parts by weight | | | |
|---|---|---|---|---|
| | 7 | 8 | 9 | 10 |
| Polyester | 40 | 40 | 40 | 40 |
| Styrene | 10 | 10 | 10 | 10 |
| $Na_2B_4O_7 \cdot 10H_2O$ | 25 | 25 | 25 | 25 |
| Sodium borate (FR-28) | 25 | 25 | 25 | 25 |
| Water | 200 | 200 | 200 | 200 |
| Rasorite 65 | 50 | 50 | 50 | 50 |
| Silica | 50 | 50 | 50 | 50 |
| Asbestos | 20 | 20 | 20 | 20 |
| Hydrated alumina | | 50 | 50 | 50 |
| Iron powder | | 100 | | |
| Bronze powder | | | 100 | |
| Stainless steel powder | | | | 100 |

Examples 11 to 16

The following examples illustrate the utility of using water soluble, basic borate compound to reform water extendable polyester resin emulsion which was broken by the addition of a filler. The water extendable polyester resins used were Ashland WEP 661 (Resin-A), manufactured by Ashland Chemical Company, according to U.S. Pat. 3,256,219, and a water extendable polyester manufactured by Reichhold Chemicals Inc., and known as 32-177 (Resin B). To 50 parts by weight of resin which contained about 20% by weight styrene there was added 100 parts by weight water. Sawdust, perlite (expanded silica) and vermiculite were added, respectively, to the resin samples. As shown in Table III the addition of 5 parts by weight sawdust, 20 parts by weight perlite (expanded silica), and 20 parts by weight vermiculite, respectively, broke the emulsion within one to five minutes after addition with agitation. When catalyzed the samples of the broken emulsion would not polymerize into a solid mass. To each of the broken emulsions there was added 50 parts by weight of a sodium borate compound known as FR-28 with agitation. In each instance the mixtures formed into an homogeneous mass which, when catalyzed, cured to a solid.

TABLE III

| Example | Parts by weight | | | | | |
|---|---|---|---|---|---|---|
| | 11 | 12 | 13 | 14 | 15 | 16 |
| Resin-A (Ashland) | 50 | 50 | 50 | | | |
| Resin-B (R.C.I.) | | | | 50 | 50 | 50 |
| $H_2O$ | 100 | 100 | 100 | 100 | 100 | 100 |
| Sawdust added to break emulsion | 5 | | | 5 | | |
| Perlite added to break emulsion | | 20 | | | 20 | |
| Vermiculite added to break emulsion | | | 20 | | | 20 |
| Sodium borate (FR-28) added to reconstitute emulsion | 50 | 50 | 50 | 50 | 50 | 50 |

Example 17 and Control A

Two wall core constructions were prepared; in one, there was used the polyester formulation shown in Example 5; for the other, there was used an identical formulation except that polyester resin was Reichhold 32-177 and to which a water soluble basic borate compound was not added.

For the inorganic matter of each core there was dry-blended ½" chopped glass fibers, Rasorite 65 (an anhydrous sodium borate manufactured by U.S. Borax and Chemical Corp.), and a mixture of perlite, silica and vermiculite. The polyester resin binder with promoters, accelerators and catalysts added was blended with the mixture of glass fibers and fillers, and cast into panels 1" thick. Upon cure, both panels were hard and light. When the flame of a propane torch was applied to the surface of the panel containing the water soluble borate compound there was an initial smoking which terminated in less than one minute. For the balance of the exposure, which was in excess of five minutes, the area local to the flame became white-hot. The flame penetrated part of the panel, but there was no propagation of the flame over the surface of the panel. When the flame was removed, borax and silica in the zone of the flame fused into a glass-like mass. When the control panel was prepared using a water-in-oil emulsion of RCI 32-177 as the binder, the core, while rigid when exposed to a propane flame, smoked excessively and smoking continued throughout a five minute application of the flame with extensive charring and discoloration of the surface of the panel. The formulations used for the panels are shown in Table IV.

TABLE IV

| | Parts by weight | |
|---|---|---|
| | Example 17 | Control A |
| Water extendable polyester | | 40 |
| Conventional Polyester | 40 | |
| Styrene | 10 | 10 |
| $H_2O$ | 200 | 200 |
| $Na_2B_4O_7 \cdot 10H_2O$ | 50 | |
| Expanded silica-vermiculite | 50 | 50 |
| Chopped glass fibers (½") | 20 | 20 |
| Rasorite 65 | 50 | |

Example 18 and Control B

There was prepared an unsaturated polyester resin-water soluble borate compound-water formulation from Reichhold Chemicals Inc., Polyester Resin 33-402. The formulation consisted of 40 parts by weight polyester resin, 10 parts by weight styrene monomer, 200 parts by weight water, and 50 parts by weight sodium borate (FR-28). The mixture was catalyzed, cast into a panel ⅛" thick and allowed to cure.

As a control, there was prepared a formulation comprising 40 parts by weight Ashland water extendable polyester prepared according to U.S. Pat. 3,256,219, 10 parts by weight styrene monomer and 200 parts by weight water. The mixture was also catalyzed and cast into a panel ⅛" thick.

Both panels were placed into an oven maintained at 180° F. for 48 hours and subjected to the ASTM D-568 flammability test. The burning rate for the sample prepared with the borate compound was zero. The burning rate for the Control was 31.2 seconds.

Example 19

Twenty grams of sodium borate (FR-28) were added to 10 grams of water and heated until the solution became clear. When cooled, the solution was clear to hazy and more viscous.

Fifty grams of Silmar S-40, a water clear polyester resin, was added to the aqueous borax solution by mere mixing with a spatula. The resultant mixture was a thick milk-white emulsion. Fifty gram of water was added with gentle mixing with a spatula to extend the emulsion. When catalyzed, the mixture cured into a solid mass.

Examples 20 to 25

A variety of commercially available unsaturated polyester resins containing styrene as the monomer were employed to demonstrate the broad utility of water soluble, basic borate compounds in rendering polyester resins compatible with water.

The resins used were Cargil PE 251 (Ex. 20), a general purpose conventional polyester used in gel coats and castings, Vistrone E-604 (Ex. 21), manufactured by Silmar Chemicals, Aropol 7220MC (Ex. 22), manufactured by Ashland Chemicals, Dion DR 833, manufactured by Diamond-Shamrock Company (Ex. 23), R.C.I. 33-402 (Ex. 24) and R.C.I. 31-830 (Ex. 25) both manufactured by Reichhold Chemical Company.

TABLE V

| | Parts by weight | | | |
|---|---|---|---|---|
| Example | Resin | $H_2O$ | Sodium borate | Remarks |
| 20 | 40 | 60 | 40 | Hard, high impact. |
| 21 | 40 | 60 | 40 | Do. |
| 22 | 40 | 60 | 40 | Hard, brittle. |
| 23 | 40 | 60 | 40 | Flexible, tough. |
| 24 | 40 | 60 | 40 | Hard, high impact. |
| 25 | 40 | 60 | 40 | Flexible, tough. |

Example 26

A fire proof wall core was fabricated as follows: There was dry-blended 100 parts of a mixture of:

| Component | Percent By Weight |
|---|---|
| Vermiculite | 25 |
| Perlite | 25 |
| 1″ Chopped Glass Fibers | 25 |
| Asbestos Fibers | 25 |

As the binder system, there was used:

| Component | Parts By Weight |
|---|---|
| R.C.I. 33–402 (Reichhold Chemical Co.) | 80 |
| Styrene Monomer | 20 |
| Diablo 700X (a chlorinated wax manufactured by Diamond-Shamrock Chemical Co.) | 10 |
| Antimony trioxide | 10 |
| Water | 400 |
| Sodium Borate (FR–28) | 100 |
| Rasorite 65 | 100 |

To the binder composition there was added with agitation 3 parts by weight of a 12% solution of cobalt octoate, 0.5 parts dimethyl aniline and 1.5 parts by weight methyl ethyl ketone provided. The resultant binder composition was blended into the filler system and the resulting mass cast into a panel core 1″ thick. The cured core was rigid and of extremely high strength. After cure, the panel was exposed to a propane flame. No flame or black smoke evolved. Upon prolonged exposure there only appeared to be volatilization occurring at the zone upon which the flame was impinged and a glass coat formed upon cooling.

What is claimed is:

1. A process for preparing a curable polyester emulsion which comprises:
   (a) forming an aqueous solution of a water soluble basic borate compound as an emulsifying agent for the polyester;
   (b) adding, with agitation, the aqueous solution to a resin system comprising at least one unsaturated polyester resin prepared by the reaction of a polybasic acid and a dihydric alcohol and including at least one ethylenically unsaturated monomer to form an emulsion.

2. A process as claimed in claim 1 in which the basic borate compound is present in the aqueous solution in an amount from about 10 to about 100 parts by weight based on the weight of the resin system containing the unsaturated polyester resin.

3. A process as claimed in claim 1 in which the water soluble basic borate compound is dissolved in water with heating.

4. A process as claimed in claim 1 in which the water is present in an amount up to about 600 parts by weight per 100 parts by weight resin system.

5. A process as claimed in claim 1 in which the water soluble basic borate compound is selected from the group consisting of sodium borate, sodium tetraborate decahydrate, and mixtures thereof.

6. A process as claimed in claim 2 in which the water soluble basic borate compound is selected from the group consisting of sodium borate and sodium tetraborate decahydrate, and mixtures thereof.

7. A process as claimed in claim 1 in combination with the steps of adding to the emulsion a catalyst and curing the emulsion.

8. A process as claimed in claim 7 in which initiators for said catalyst are also present.

9. A process as claimed in claim 8 in which the catalyst is methyl ethyl ketone peroxide and the initiators are selected from the group consisting of dimethyl aniline and cobalt octoate.

10. A method as claimed in claim 8 in which an inorganic filler is added prior to cure.

11. A method as claimed in claim 10 in which the inorganic filler added is selected from the group consisting of chopped glass fibers, silica, vermiculite, perlite asbestos, and mixtures thereof.

12. A process as claimed in claim 10 in which a water insoluble borate compound is present.

13. A process as claimed in claim 12 in which the water insoluble borate compound is present in an amount of from about 10 to about 20 percent by weight based on the total weight of the inorganic fillers.

14. A process for making a curable polyester resin which comprises:
   (a) adding to a resin system comprising at least one unsaturated polyester prepared by the reaction of a poly basic acid and a dihydric alcohol and including at least one ethylenically unsaturated monomer at least one water soluble, basic borate compound as an emulsifying agent for the polyester;
   (b) adding, with agitation, to the mixture of the resin system and said basic borate compound an amount of water sufficient to dissolve said basic borate compound and form an emulsion of the basic borate compound and the resin system.

15. A process as claimed in claim 14 in which the basic borate compound is present in an amount of at least 10 parts by weight per 100 parts by weight resin system.

16. A process as claimed in claim 14 in which the water soluble basic borate compound is present in an amount of from about 20 to about 100 parts by weight resin system.

17. A process as claimed in claim 16 in combination with the steps of adding an initiator and a promoter to the composition and curing the composition.

18. A process as claimed in claim 16 in which an inorganic filler is added prior to cure.

19. A process as claimed in claim 18 in which the inorganic filler is selected from the group consisting of chopped glass fibers, silica, vermiculite, asbestos and mixtures thereof.

20. A process as claimed in claim 19 in which a water insoluble borate is present.

21. A process as claimed in claim 20 in which the water insoluble borate is present in an amount up to about 10 to about 20 weight percent based on the total weight of inorganic fillers.

References Cited

UNITED STATES PATENTS

| | | | |
|---|---|---|---|
| 3,189,513 | 6/1965 | Calderwood et al. | 260—2.5 N |
| 3,214,400 | 10/1965 | Silver | 260—29.2 |
| 3,256,219 | 6/1966 | Will | 260—2.5 N |
| 3,281,252 | 10/1966 | Fairchild | 106—15 F.P. |
| 3,311,035 | 3/1967 | Poskey et al. | 260—40 X |
| 3,367,890 | 2/1960 | McManimie | 260—2.5 N |
| 3,438,847 | 4/1969 | Chase | 106—15 F.P. |

MURRAY TILLMAN, Primary Examiner

A. H. KOELKERT, Assistant Examiner

U.S. Cl. X.R.

106—41; 260—2.5 N, 28.5 A, 29.6 MM, 29.6 WQ, 40 R

PO-1050
(5/69)

UNITED STATES PATENT OFFICE
CERTIFICATE OF CORRECTION

Patent No. 3,845,067      Dated October 29, 1974

Inventor(s) Julio Lopez Mesa

It is certified that error appears in the above-identified patent and that said Letters Patent are hereby corrected as shown below:

Column 6, line 2, between "compatible" and "absorbents" insert -- uv --.

Column 8, line 48, "gram" should read -- grams --.

Signed and sealed this 18th day of February 1975.

(SEAL)
Attest:

RUTH C. MASON
Attesting Officer

C. MARSHALL DANN
Commissioner of Patents
and Trademarks